US005912761A

United States Patent [19]
Jander et al.

[11] Patent Number: 5,912,761
[45] Date of Patent: Jun. 15, 1999

[54] APPARATUS AND METHOD FOR CONTROLLING SHARED OPTICAL PUMP POWER SOURCES

[75] Inventors: Ralph Brian Jander, Freehold; Arthur A. Baumgarten, Basking Ridge, both of N.J.

[73] Assignee: Tyco Submarine Systems Ltd., Eatontown, N.J.

[21] Appl. No.: 09/010,599

[22] Filed: Jan. 22, 1998

[51] Int. Cl.$^6$ .................... H04J 14/00; H04J 14/04; H01S 3/094
[52] U.S. Cl. .................... 359/341; 359/134; 359/177; 359/337
[58] Field of Search .................... 359/134, 161, 359/177, 194, 337, 341

[56] References Cited

U.S. PATENT DOCUMENTS 5,245,690 9/1993 Aida et al. .................... 385/142
5,664,131 9/1997 Sugiya .................... 359/341

FOREIGN PATENT DOCUMENTS 404003029  1/1992  Japan .
5235445    9/1993  Japan .
6-338874  12/1994  Japan .

OTHER PUBLICATIONS

Aida et al., & revs., Inst. Electron. Inf. Commun. Eng. B–1, vol. J75B–I, 190 5, pp. 298–303, May 1992.

Primary Examiner—Nelson Moskowitz
Attorney, Agent, or Firm—Kenyon & Kenyon

[57] ABSTRACT

An optical gain block that is pumped by one or more pump input modules is disclosed. Each pump input module includes a pump source, a pump power control circuit and a bus interface. Each of the available pump input modules detect the presence and pump power of other available pump input modules in order to properly adjust the output power of its own pump source. By controlling the power provided by each of the available pump input modules, the gain block output will be maintained at a specified output power level while all pump input modules share in delivering the required total input pump power. Upon the insertion or removal of any pump input module, the remaining pump input modules will adjust their output power accordingly to maintain the gain block output power at the specified level.

17 Claims, 2 Drawing Sheets

APPARATUS AND METHOD FOR CONTROLLING SHARED OPTICAL PUMP POWER SOURCES

BACKGROUND OF THE INVENTION

The present invention relates to a method for controlling multiple amplifier pump sources in a power sharing configuration in order to pump active gain media such as Erbium doped fiber amplifier modules and Ytterbium or Neodymium dual cladding fiber lasers.

Fiber optic technology has evolved significantly since the invention of the laser. Semiconductor lasers, fiber, and devices have been continuously improved in support of increasingly sophisticated fiber communication systems. The development of both high powered pump lasers at 1480 nm and 980 nm and rare earth doped fiber stimulated the realization of in-fiber amplifiers. Optical fiber amplifiers employing Erbium doped fiber as the gain medium allow communication signals to be power boosted prior to transmission or detection as well as to periodically compensate for transmission loss in a long repeatered communication system. These amplifiers have had a significant impact on the development of all-optical communication systems.

Development of components for fiber amplifiers has continued at a high rate by many suppliers who recognize the huge market for these products as the fiber communication industry continues to build systems which take advantage of the fiber amplifier. As an example of the accelerated development of components for fiber amplifiers, in the past few years pump laser manufacturers have worked to realize higher pump power levels, sought to build-in and measure reliability, and to add in-package isolators. Meanwhile, prices for components for fiber amplifiers have come down significantly. All of which indicates that the amplifier market is maturing and that there is a growing, large competitive base of commercial component vendors that are continuing to develop and supply fiber amplifiers.

The design of fiber optic communication systems has also evolved quickly with the advent of the erbium doped fiber amplifier. Amplifiers quickly supplanted regeneration repeaters as the gain medium of choice in communication systems. Long haul systems now use amplifiers to boost signals to compensate for fiber loss, rather than utilizing the previous method of detecting and regenerating the communication signals. Likewise, the electronic terminal equipment which initiates and terminates the optical signals on the fiber communication system has been modified to accommodate both high power optical booster amplifiers and low noise, low signal preamplifiers.

With the increasing demand for data communications capacity brought on by the demand for World Wide Web access and Internet services, optical communication systems are being driven to ever higher data capacity. The first large multi-wavelength undersea systems are now being realized.

These multi-wavelength systems require more sophisticated and costly terminal equipment to handle the greater volume of channels. Likewise, optical amplifier design has grown ever more complicated in response to increasing constraints from terminal equipment architects. Reliability of the amplifier has become a key challenge. In some instances, a terminal amplifier carries the entire flow of traffic. Meanwhile, unlike line optical amplifiers that are utilized in repeaters, where typical input and output power levels are relatively constant and predictable, which allows for less sophisticated amplifier designs, terminal amplifiers must handle a relatively larger range of input power levels and may have to deliver a user selectable output power level. In addition, unlike line amplifiers where bandwidth shaping integral to the amplifier is not required, in the terminal amplifier the output must be internally shaped to provide some measure of output power flatness. Thus, the gain requirements have become a second key challenge in terminal amplifier design.

It is known how to pump an Erbium doped fiber amplifier by utilizing a variety of configurations of one or more pump lasers. Generally, the gain medium is either co-pumped, counter-pumped or simultaneously co- and counter-pumped with either a 980 nm or 1480 nm semiconductor pump laser. A variable gain amplifier may be created by controlling the optical power of one or more of the pumps that feed the gain medium. A stabilized constant output amplifier can be constructed by controlling the pump power by utilizing a feedback loop that includes a signal detector on the amplifier output. Generally, the pumps and control circuitry are co-located with the amplifier optical circuit.

However, a drawback with the known methods of pumping an Erbium doped fiber amplifier by utilizing one or more pump lasers is the lack of the ability to share, combine or remove in real time, i.e., during amplifier operation, one or more of the pump sources without significantly or dramatically influencing the operation of the amplifier. Therefore, it would be desirable to provide for a reliable, redundantly pumped amplifier or laser configuration that permits real-time power sharing among the available pump sources.

SUMMARY OF THE INVENTION

The drawbacks in the prior art are overcome by the present invention for an apparatus and method for controlling shared optical pump power input sources. The invention provides for a reliable, redundantly pumped amplifier or laser configuration by utilizing multiple pump sources.

In accordance with the present invention, an optical gain block that is pumped by one or more pump input modules is disclosed. Each pump input module includes a pump source, a pump power control circuit and a bus interface.

The optical gain block, which could be one of several stages of a complex sequence of gain stages, operates by conversion of the optical power supplied by the combined pump input modules into power carried by the signal at the output of the optical gain block. Each of the available pump input modules act to detect a reference power signal from the output of the optical gain block and to detect the presence and pump power level of other available pump input modules in order to properly adjust the output power of its own pump source. By controlling the power provided by each of the available pump input modules, the gain block output will be maintained at a specified output power while all pump input modules share in delivering the required total input pump power. Upon the insertion or removal of any pump input module, the remaining pump input modules will adjust their output power accordingly to maintain the gain block output power at the specified level.

In this manner, the present invention provides for utilizing multiple pump sources to supply input pump power to an amplifier. The use of multiple pump sources enhances the amplifier's overall performance, increases the overall reliability of the pumped amplifier, and provides for the ability to remove and replace failed or impaired pump sources without disrupting the amplifier performance or the signal traffic flowing through the amplifier. In addition, the reliability of each individual pump source is increased by virtue of its operation in the lowest possible output power state. An

3 additional benefit of the present invention is that increased input pump power levels and, therefore, increased gain from the amplifier can be achieved when compared to that which is achievable when utilizing fewer input pump sources. The invention allows greater amplifier output power when redundancy is traded for the higher pump power available from a multiple pump source.

DETAILED DESCRIPTION

Figure 1:
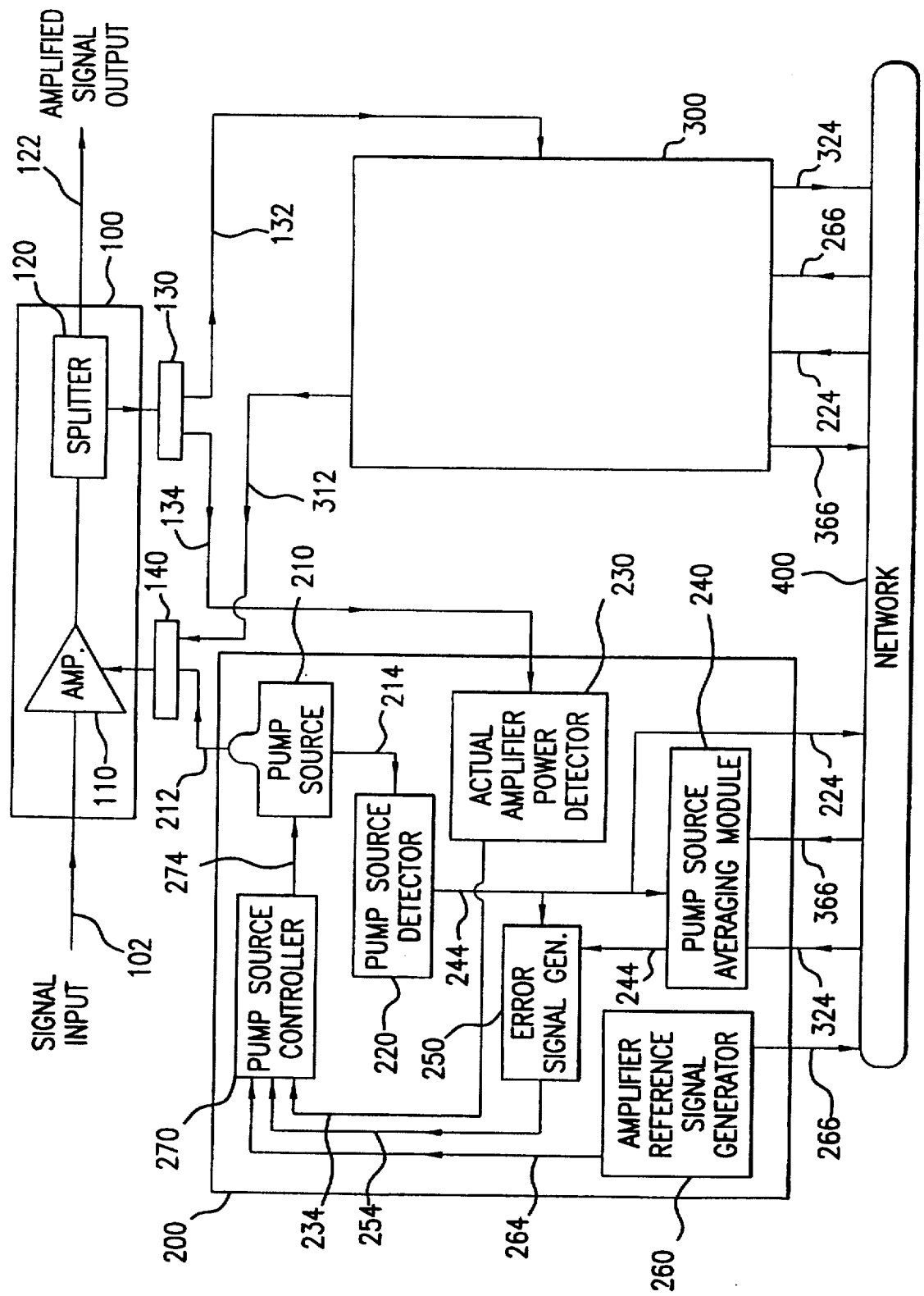
FIG. 1 provides a functional block diagram for one embodiment of the apparatus for controlling shared optical pump power sources of the present invention.

FIG. 1 provides a functional block diagram for one embodiment of the shared optical pump power apparatus of the present invention. The embodiment of FIG. 1 includes an optical circuit 100 and a plurality of pump input modules, two of which are illustrated in FIG. 1 as modules 200 and 300. Pump input modules 200 and 300 provide pump power for optical gain stage 110 in optical circuit 100. The power levels of pump input modules 200 and 300 are automatically controlled to ensure that the amplified signal output from optical circuit 100 is at a desired power level. Since pump input modules 200 and 300, and any additional pump input modules that are utilized when practicing the present invention, perform similar functions and function in a similar manner, a detailed description for pump input module 200 will only be provided.

As shown in FIG. 1, optical circuit 100 includes an optical gain stage 110 and an optical tap device or splitter 120. Optical gain stage 110 can be any of a variety of devices, including but not limited to an Erbium-doped fiber amplifier or a Ytterbium or Neodymium dual cladding fiber laser. An input signal 102 is input to optical gain stage 110 where the signal is amplified and transmitted as amplified output signal 122. An optical tap device 120, or splitter, is utilized to tap a small portion of the amplified output signal power 122 from optical circuit 100. This tapped portion of the amplified output signal is provided to pump input modules 200 and 300 and is utilized as a reference signal that indicates the actual power level of the amplifier. Splitter 130 directs a portion of the power level signal to each pump input module.

In describing the operation of the pump input modules, as shown in FIG. 1, pump input module 200, and each pump input module, contains a pump source 210 and a pump source power control circuit. The pump source power control circuit automatically controls the output pump power of the pump input module's pump source 210 such that the combined output power of all available pump input modules, as is input to optical circuit 100 to pump optical gain stage 110, is maintained at a specified level. Each input module's pump source power control circuit controls the output power of the pump source of the pump input module by analyzing three reference signals. These reference signals, which will be described in detail later in this specification, are indicative of the actual amplifier power output level, the desired amplifier power output level, and the relative pump source power output.

The pump source power control circuit of pump input module 200 includes pump source detector 220, actual amplifier power detector 230, pump source averaging module 240, error signal generator 250, and pump source con-

4 troller 270. Also included on pump input module 200 is amplifier reference signal generator 260. The functions of all of these components will be described in detail later in this specification.

In defining the functional flow of information in practicing the present invention, as shown in FIG. 1 and as discussed previously, the reference signal, or first signal, representative of the actual amplifier power level, as provided by splitters 120 and 130, is transmitted to pump input module 200 by utilizing transmission path 134. This signal is also transmitted to pump input module 300 by utilizing transmission path 132. This reference signal provides an input to each pump input module for the actual power out of the amplifier and can be generated and transmitted by a variety of techniques well known in the art. For example, the signal can be transmitted as an optical signal or an electrical signal. The present invention is not limited to any particular type of transmission mode for the reference signals that are transmitted and, consequently, is not limited to any particular implementation for the components and circuitry utilized to perform the functions required in practicing the present invention. For example, the present invention can be implemented in an analog or digital circuit and can utilize any of a variety of components for practicing the present invention.

The reference signal for the actual amplifier power level is received in pump input module 200, and in the other available pump input modules, and is utilized by the pump input module's pump source power control circuit. The actual amplifier power level signal is received by actual amplifier power detector 230. The actual amplifier power detector 230 detects the power level signal transmitted on path 134 and as such, contains an appropriate receiver. For example, if the reference signal transmitted over path 134 is an optical signal, an optical detector would be provided in detector 230. Power level detector 230 could also contain additional signal processing components depending on the particular implementation utilized for the generation technique for the reference signal and the pump source power control circuit. This reference signal for the actual amplifier pump power is transmitted by detector 230 to pump source controller 270 over transmission path 234.

Pump source controller 270 performs the function of controlling the output power level of pump source 210 for pump input module 200. Controller 270 controls the power level of pump source 210 by analyzing the three reference signals addressed above, namely the actual amplifier power output level signal, the desired amplifier power output level signal, and the relative pump source power output signal, each of which are input to controller 270. Controller 270 will be discussed in more detail later in this specification.

The second reference signal that is input to controller 270 is the relative pump source power output signal or pump source comparison signal. This signal is generated and provided to controller 270 as follows. A reference signal indicative of the output power provided by pump source 210 is provided from pump source 210 over transmission path 214. As with the reference signal for the actual amplifier power level, as discussed previously, the pump source reference signal for the power output from pump source 210 can be transmitted as an optical signal or an electrical signal. This reference signal is detected and processed by the calibrated pump source detector 220. Pump source detector 220 is calibrated so that the output of detector 220 is proportional to pump output power. Pump source detector 220 transmits the reference signal for the pump source power output level for pump source 210 to three input locations.

The first of these three input locations for the reference signal for the power output level of pump source 210 is to pump source averaging module 240. Pump source averaging module 240 receives separate inputs from each pump input module that indicates the calibrated power output from each available pump source on each pump input module. Therefore, as shown in FIG. 1, pump source averaging module 240 receives an input signal for the actual power supplied by pump source 210 through transmission path 224 and an input signal for the actual power supplied by pump input module 300 through transmission path 324. Pump input module 300 provides its reference signal indicative of its pump source's actual output power by having its pump source detector transmit the reference signal to network 400. The reference signal is then provided to each available pump input module's pump source averaging module by transmitting the signal over the network to each pump input module. Network 400 can be any type of network, such as a local area network (LAN), that is capable of transmitting signals between the pump input modules. In FIG. 1 the actual pump source output power level for pump input module 300 is transmitted to network 400 as signal 324 and is received at pump input module 200 as shown. In this manner, each pump input module's pump source averaging module receives a signal indicative of each available pump input module's output pump power. Additional discussion concerning the function of pump source averaging module 240 will be provided later in this specification.

The second of the three input locations for the reference signal for the actual power output provided by pump source 210 is to network 400. The purpose for providing the reference signal for the actual power output for pump source 210 to network 400 is as described above.

The third input location for the reference signal for the actual power provided by pump source 210 is to error signal generator 250. The function of error signal generator 250 will also be described later in the specification.

In continuing with the discussion of the functional flow of information in practicing the present invention, as stated previously pump source averaging module 240 receives input from each available pump input module as to the actual pump power output of that input module's pump source. Pump source averaging module 240 then analyzes all pump power inputs received to determine the average pump power output from all available pump input modules and provides an input to error signal generator 250. Because error signal generator 250 also receives as an input the reference signal for the actual power supplied by pump source 210, as discussed above, error signal generator 250 analyzes the actual pump power output of pump source 210 with reference to the average pump power of all available input modules. In this manner, error signal generator 250 generates an error signal, or pump source comparison signal, based on the analysis of the actual power supplied from each of the available pump sources. This error signal is representative of the difference between the actual power supplied by pump source 210 and the average pump power provided by all available pump sources. Therefore, error signal generator 250 determines an individual pump input module's output power level relative to the average pump power from all pump input modules.

Error signal generator 250 provides the generated pump source comparison signal to pump source controller 270. With the provision of this pump source comparison signal to pump source controller 270, the pump source controller is provided with information as to the performance of pump source 210 relative to the other available pump sources.

It is not necessary for the output power of any individual pump source on a particular pump input module to equal the average power provided by all available pump input modules. There may be reasons for the designer to provide for one or more pump input modules to supply a larger share of the total output power required than is provided by other input modules, however, this is a particular application design consideration and can be programmed into the control software or wired into a specific analog circuit implementation, as appropriate and as required.

The third reference signal provided to pump source controller 270 is the signal indicative of the desired amplifier power output level. Amplifier reference signal generator 260 provides the reference signal which is indicative of the desired output power level for module 100. The specific form and generation technique for the reference signal for the desired amplifier power output level can be implemented in a variety of ways depending on the particular design selected for implementing the pump source power control circuit. For example, the reference signal can be a control voltage input by the operator. By providing a reference signal indicative of the desired amplifier output power to controller 270, controller 270 has a reference from which to analyze the actual performance of amplifier 110. The reference signal indicative of the desired amplifier output power generated by amplifier reference signal generator 260 is provided to controller 270 over transmission path 264, as shown in FIG. 1.

Amplifier reference signal generator 260 also generates a pump input module availability signal for transmission over network 400. This availability signal is represented in FIG. 1 as signal 266 for pump input module 200. Signal 266 is received by each other available pump input module. As shown in FIG. 1, availability signal 266 is transmitted to network 400 from pump input module 200 and is received by pump input module 300. This availability signal is utilized to inform each other available input module of a particular input module's availability to provide pump power. This availability signal, for example, could be utilized to close a switch in each pump input module's pump source averaging module such that with the switch closed, reference signal 224, for example, which provides a signal indicative of the actual output pump power for pump source 210 of pump input module 200, would be received within another pump input module's pump source averaging module.

Based on the three reference signals provided to pump source controller 270, i.e, the actual amplifier power output level, the desired amplifier power output level, and the performance of the pump input module's own pump source relative to the power provided by all available pump sources, pump source controller 270 will analyze these signals and automatically adjust the power output of pump source 210 of pump input module 200 to meet defined system parameters. For example, so that the amplifier achieves a predefined output power level with all available pump sources sharing equally or unequally weighted among particular pump sources.

The control logic of pump controller 270 includes an appropriate time constant to control the rate of adjustment of the power output of pump source 210. The time constant is set based upon the particular design requirements of the system into which the present invention is integrated. In this manner, pump controller 270 will automatically control, in real time, i.e., during amplifier operation, the output power level of pump source 210 based on the availability and output power level of other available pump sources without significantly or dramatically influencing the operation of the amplifier. In a complex system with several pump modules and possibly several control loops, stable (non-oscillating) system operation must be assured. One way to ensure stable operation in the present invention is to ensure that pump controller 270 meets two requirements: 1) it must never allow pump source 210 to turn on or off faster than a predefined time constant, and 2) it must respond to the bipolar error signal 254, indicating an inequality between pump output powers, in a unipolar fashion, i.e., by only turning down pump source 210. An error signal 254 with a polarity demanding source 210 to be adjusted to higher output power must be blocked (not acted upon by controller 270).

Since each pump input module, e.g. pump input module 300, is also provided with the same reference signals for the actual amplifier output power, the desired amplifier output power and the performance of its own pump source relative to the average power output of all other available pump sources, pump input module 300 will automatically adjust its power level to meet defined system parameters. Because each pump input module's power output is automatically transmitted to each other available pump input module and, therefore, each pump input module is able to determine its power output relative to the average power provided by all other available pump sources, any adjustment to a particular pump source's power output will be sensed by the other pump input modules and their power outputs will be adjusted accordingly until a desired output power level for each pump input module, which is defined based on the particular design requirements for a particular application, is achieved. As such, all pump sources will be automatically adjusted to share in pumping amplifier 110 based on defined system parameters. In this manner, if a currently available pump source fails or if an additional pump source is made available, the power output levels of the other available pump sources will be automatically adjusted to compensate for these changes.

Figure 2:
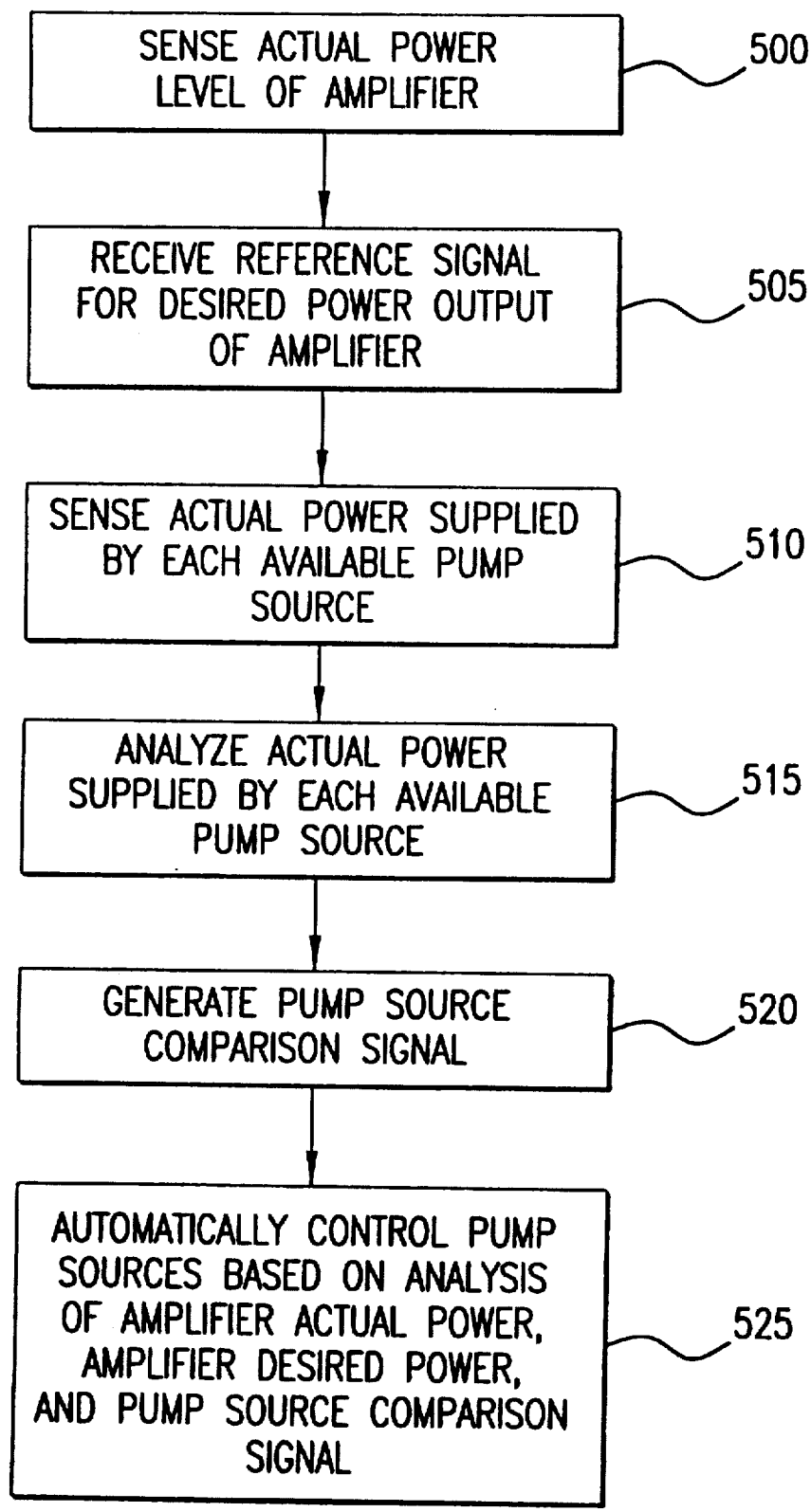
FIG. 2 provides a flow chart for controlling the shared optical pump power sources when practicing an embodiment of the present invention.

In operation, the process for controlling multiple pump sources in accordance with one embodiment of the present invention is provided by the process flow chart of FIG. 2. In an analog implementation the functions of each box probably would be done in a parallel, continuous manner, i.e., not sequential. A processor, of course, would do it sequentially. Step 500 represents the step of sensing a first signal representative of the actual power level of the amplifier by each of the available pump input modules. Step 505 shows the step of receiving a reference signal representing the desired power output level of the amplifier at each pump input module. As shown in step 510, a signal indicative of the actual power supplied by each of the available pump sources is received at each pump input module's pump source averaging module. The pump source averaging module analyzes the actual power supplied from each of the available pump sources, as is represented by step 515. In step 520, a pump source comparison signal is generated based on the analysis of the actual power supplied from each of the available pump sources and the power supplied by an individual pump input module's pump source. Step 525 indicates the step where the pump source controller automatically controls the power supplied by the pump source of the pump input module that it is associated with based on analyzing the actual amplifier power output, the desired amplifier power output, and the pump source comparison signal.

Several variations on the disclosed embodiments are contemplated. In the disclosed embodiments, the output signal tap and splitter are positioned to sense the reference power level signal representative of the actual power level of the amplifier by sensing the output signal power level of the amplifier, however, the reference signal could be obtained by sensing the combined input power to the amplifier as supplied by all available pump sources. With this alternative embodiment, the individual pump input modules might have different pump wavelengths or polarization states and be combined by wavelength division or polarization multiplexing and this combined pump power would be sensed.

In the disclosed embodiment, each pump input module contains its own separate pump source power control circuit, however, each pump input module is not required to contain its own pump source power control circuit. Alternatively, the pump source power control circuit could be embodied as a control circuit that is independent from any particular pump input module but yet still automatically control each pump source based on the analysis of the reference signals as disclosed. In this alternative embodiment, the reference signals for the actual amplifier power output level and the desired amplifier power output level, and signals indicative of the actual output power for each pump source would be provided to the pump source power control circuit, as previously disclosed. The pump source power control circuit would analyze the signals and control each pump input module's pump source as described. The only modification that would be required to the flow of information as previously disclosed is that addressing would be required for the reference signals that are indicative of the actual output power for each pump source and for the signals that are input to the central error signal generator so that the error signal generator would know which individual pump source output power signal it was analyzing against the average output power signal. Also, addressing would be required for the output signals from the error signal generator and the central pump source controller so that the pump source controller would know which pump source to control based on the analyzed signals.

Additionally, all available pump sources are not required to be automatically controlled when practicing the present invention. For example, a particular design implementation could provide for the automatic control of the output power of only one input module. The other available pump sources could be non-controllable and of constant power output. In this manner, if one of the constant power output modules failed, the controllable pump input module would be automatically controlled to compensate for the loss of the failed pump input module. Thus, one input module would be controlled to compensate for changes in the output power levels of the other pump sources.

Whereas the pump input modules are disclosed as being a separate stand-alone pump power supply unit, the pump input modules could be integrated into the optical circuit.

It is also not required that a network be provided to transmit signals from one input module to other input modules. The transmission paths required for the flow of information signals could be direct paths, or "hard-wired" connections, between all available pump input modules.

As disclosed, an apparatus and method for automatically controlling amplifier pump sources is disclosed. Each available pump input module shares in providing pump power to an optical gain stage. The output of all available pump sources is automatically adjusted, based on the power supplied by each pump source, to maintain a desired power output level for the gain stage. In this manner, all pump sources share in providing pump power to an amplifier and are automatically adjusted to compensate for changes in available pump power.

What is claimed is:

1. A method for automatically controlling the power level of multiple amplifier pump sources comprising the steps of:
- sensing a first signal representative of the actual power level of the amplifier;
- receiving a reference signal representing the desired power level of the amplifier;
- sensing the actual power supplied by each of a plurality of pump sources;
- analyzing the actual power supplied by each of said plurality of pump sources;
- generating a pump source comparison signal based on the analysis of the actual power supplied from each of said plurality of pump sources;
- analyzing said first signal representative of the actual amplifier power level, said reference signal representing the desired amplifier power level, and said pump source comparison signal; and
- automatically controlling the power supplied from each of said plurality of pump sources based on the analysis of said first signal, said reference signal representing the desired amplifier power level signal and said pump source comparison signal.

2. The method for automatically controlling the power level of multiple amplifier pump sources according to claim 1 wherein the step of sensing a first signal representative of the actual power level of the amplifier is accomplished by sensing the combined input power to the amplifier from said plurality of pump sources.

3. The method for automatically controlling the power level of multiple amplifier pump sources according to claim 1 wherein the step of sensing a first signal representative of the actual power level of the amplifier is accomplished by sensing the output signal power level from the amplifier.

4. The method for automatically controlling the power level of multiple amplifier pump sources according to claim 1 wherein each of said plurality of amplifier pump sources is contained on a separate pump input module and wherein each of said pump input modules contains a pump source power control circuit for automatically controlling only the power supplied by said pump source on said pump input module.

5. The method for automatically controlling the power level of multiple amplifier pump sources according to claim 4 wherein each of said plurality of pump input modules transmits a reference signal representative of the actual power supplied by said pump source on said pump input module over a network for receipt by each of the other of said plurality of pump input modules.

6. A method for controlling the pump power level of an amplifier pump source when utilized with multiple pump sources to pump an amplifier comprising the steps of:
- sensing a first signal representative of the actual power level of the amplifier;
- providing a reference signal representing the desired power level of the amplifier;
- sensing the actual power supplied by a first amplifier pump source;
- sensing the actual power supplied by a second amplifier pump source;
- analyzing the actual power supplied by said first amplifier pump source and said actual power supplied by said second amplifier pump source;
- generating a pump source comparison signal based on the analysis of the actual power supplied by said first amplifier pump source and said actual power supplied by said second amplifier pump source;
- analyzing said first signal representative of the actual power level of the amplifier, said reference signal representing the desired power level of the amplifier and said pump source comparison signal; and
- automatically controlling the power supplied by said first amplifier pump source based on the analysis of said first signal, said desired amplifier power level signal and said pump source comparison signal.

7. The method for controlling the pump power level of an amplifier pump source of claim 6 wherein the step of automatically controlling the power supplied by said first amplifier pump source includes the steps of:
 a) preventing said first amplifier pump source from turning on or off faster than a predefined time constant; and
 b) responding to said pump source comparison signal when said pump source comparison signal indicates an inequality between the actual power supplied by said first amplifier pump source and said actual power supplied by said second amplifier pump source by only turning down the power of said first amplifier pump source.

8. The method for controlling the pump power level of an amplifier pump source of claim 6 wherein the step of sensing a first signal representative of the actual power level of the amplifier is accomplished by sensing the combined input power to the amplifier from said first amplifier pump source and said second amplifier pump source.

9. The method for controlling the pump power level of an amplifier pump source of claim 6 wherein the step of sensing a first signal representative of the actual pump power level of the amplifier is accomplished by sensing the output signal power level from the amplifier.

10. The method for controlling the pump power level of an amplifier pump source of claim 6 further comprising a pump input module wherein said pump input module contains said first amplifier pump source and a pump source power control circuit for automatically controlling only the power supplied by said first amplifier pump source.

11. An apparatus for controlling multiple amplifier pump sources comprising:
- a plurality of pump sources; and
- at least one pump source power control circuit, wherein said at least one pump source power control circuit senses the actual power level of the amplifier, the actual power supplied by each of said plurality of pump sources, and receives an input reference signal representative of the desired power level of the amplifier and wherein said at least one pump source power control circuit automatically controls the power level of said plurality of pump sources.

12. The apparatus for controlling multiple amplifier pump sources of claim 11 wherein said plurality of pump sources and said pump source power control circuit are physically located separate from the amplifier.

13. The apparatus for controlling multiple amplifier pump sources of claim 11 further comprising a plurality of pump input modules wherein each of said plurality of pump input modules contains one of said plurality of pump sources and its own separate pump source power control circuit and wherein each of said pump source power control circuits automatically controls only the power supplied by said pump source on said pump input module.

14. An apparatus for controlling the pump power level of an amplifier pump source when utilized with multiple pump sources to pump an amplifier comprising:

a first amplifier pump source; and a pump source power control circuit, wherein said amplifier pump source power control circuit senses the actual power level of an amplifier, the actual power supplied by said first amplifier pump source and the actual power supplied by a second amplifier pump source, and receives an input reference signal representative of the desired pump power level of the amplifier and wherein said pump source power control circuit automatically controls the power level of said first amplifier pump source.

15. The apparatus for controlling the pump power level of an amplifier pump source of claim 14 further comprising a pump input module wherein said pump input module includes said first amplifier pump source and said pump source power control circuit.

16. An apparatus for controlling multiple amplifier pump sources comprising:

a plurality of pump sources; and at least one pump source power control circuit, said pump source power control circuit including:

a pump source detector;

an actual amplifier power detector;

a pump source averaging module;

an error signal generator; and a pump source controller;

wherein said at least one pump source power control circuit senses the actual power level of the amplifier, the actual power supplied by each of said plurality of pump sources, and receives an input reference signal representative of the desired power level of the amplifier and wherein said at least one pump source power control circuit automatically controls the power level of said plurality of pump sources.

17. The method of claim 5 wherein said reference signal transmitted by each of said plurality of pump input modules includes an address, said address uniquely associating the transmitted reference signal to the transmitting pump input module.

* * * * *